United States Patent [19]
Iida et al.

[11] Patent Number: 5,456,961
[45] Date of Patent: Oct. 10, 1995

[54] HIGH DENSITY OPTICAL DISK

[75] Inventors: Tetsuya Iida; Shinichi Yokozeki, both of Tsurugashima, Japan

[73] Assignee: Pioneer Electronic Corporation, Tokyo, Japan

[21] Appl. No.: 87,320

[22] Filed: Jul. 8, 1993

[30] Foreign Application Priority Data

Jul. 13, 1992 [JP] Japan .................... 4-185041

[51] Int. Cl.⁶ .................................. B32B 3/02
[52] U.S. Cl. ................. 428/64.4; 428/195; 428/206; 428/323; 428/688; 428/913; 369/275.2; 430/945
[58] Field of Search ................ 369/275.2, 100; 428/64, 65, 195, 206, 323, 688, 913; 430/945, 270, 272, 9.45

[56] References Cited

U.S. PATENT DOCUMENTS 4,969,141  11/1990  Takaoka et al. .............. 361/100
5,153,873  10/1992  Spruit et al. .............. 369/275.2

FOREIGN PATENT DOCUMENTS 0343727  11/1989  European Pat. Off. .
21830   1/1990  Japan .
365930   3/1991  Japan .

Primary Examiner—Patrick J. Ryan
Assistant Examiner—William A. Krynski
Attorney, Agent, or Firm—Sughrue, Mion, Zinn, Macpeak & Seas

[57] ABSTRACT

An optical disk allows recording of information at high density and accurate reproduction of such high-density recorded information. The optical disk according to the invention has a shutter layer, formed directly or through an intermediate layer on a substrate, for tightening a light beam to be irradiated to read or write information, the shutter layer containing semiconductor fine particles.

13 Claims, 3 Drawing Sheets

HIGH DENSITY OPTICAL DISK

BACKGROUND OF THE INVENTION

1. Field of the Invention

The present invention relates to an optical disk as an optical recording medium for recording signals of various types of information, such as audio signals and video signals, and, more particularly, to an optical disk which can record information at high density or from which information recorded at high density can be reproduced accurately.

2. Description of Background Information

In general, an optical disk has a center hole in the center portion around which a single spiral track is formed to record information. As shown in FIG. 1A, a conventional recording disk of this type consists of rugged information pit portions 12, corresponding to information, formed on a transparent disk substrate 11 of polymethyl methacrylate (PMMA), an aluminum film 15 with high reflectance vapor-deposited on the substrate 11 and a protective layer 16 of plastic or the like covering the aluminum film 15.

In reproducing information from the recording disk having the above constitution, a light beam 30, such as a laser beam, is irradiated on the target information pit portions 12 on the track to be reproduced where the target information is recorded, from the side of transparent substrate 11. Light 31 reflected at the mirror portions between pits where no information pit portions 12 are present is detected as "bright" while light 32 reflected at the information pit portions 12 is detected as "dark", as shown in FIG. 1B. Pieces of information corresponding to the individual recorded pits 12a, 12b, 12c . . . of the each information pit portion 12 are reproduced with the "bright" and "dark" reflected lights.

Since the conventional optical disk and the conventional reproducing technique are constituted as described above, when information is recorded in high density by narrowing the pitch between adjoining tracks, such disk and reproducing technique involve a problem that a light beam will undesirably be irradiated over a plurality of tracks on the high-density recorded disk. To describe more specifically, as the diameter of the beam spot is determined by the wavelength of the light beam, there is a limit to make the spot size smaller. When information is recorded with a track pitch narrower than that permitted by the smallest spot size, therefore, plural pieces of information are simultaneously detected as the "dark" reflected light 32 (or "bright" light 31) from the information pits 12a, 12b and 12c of a plurality of tracks as shown in FIG. 1C. This inhibits accurate information reproduction, disadvantageously.

There is also a demand for an optical disk which can ensure high-density recording of information while having a writable recording film.

SUMMARY OF THE INVENTION

It is therefore an object of the present invention to overcome the above-discussed conventional problem and thus to provide an optical disk which can record information at high density or an optical disk which can ensure accurate reproduction of such high-density recorded information.

To achieve the foregoing and other objects and in accordance with the purpose of the present invention, an optical disk according to the present invention has a shutter layer, formed directly or through an intermediate layer on a substrate, for tightening a light beam to be irradiated to read or write information, the shutter layer containing semiconductor fine particles.

When light is irradiated from the substrate side of this optical disk, the beam is tightened by the shutter layer that contains semiconductor fine particles.

In other words, the light will pass only through that portion of the shutter layer where the light intensity is equal to or above a certain level, and will not pass through the other portion, thus further tightening the beam.

BRIEF DESCRIPTION OF THE DRAWINGS

FIGS. 4A and 4B are schematic explanatory diagrams for explaining how a light beam is tightened by providing a shutter layer of the present invention, FIG. 4A showing a beam profile with no shutter layer while FIG. 4B shows a beam profile with a shutter layer in use.

DETAILED DESCRIPTION OF THE PREFERRED EMBODIMENTS

Figure 1A:
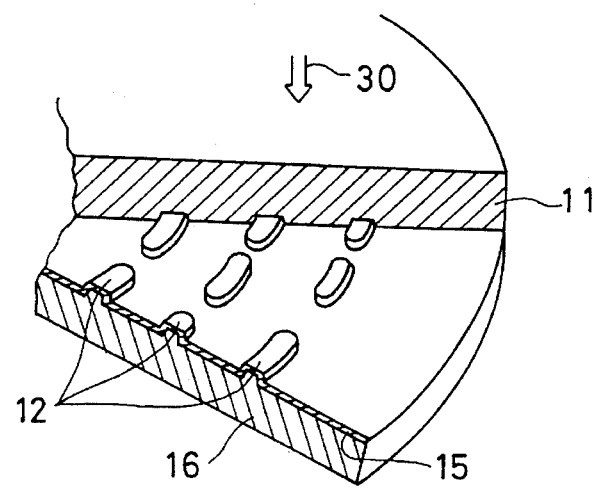
FIGS. 1A through 1C illustrate a conventional optical disk, FIG. 1A being a partly cutaway cross section of the optical disk exemplarily showing the state where information is recorded, FIG. 1B being an explanatory diagram for the principle of reading information, and FIG. 1C being a diagram for explaining the conventional problem that occurs when reproducing high-density recorded information.
Figure 1B:
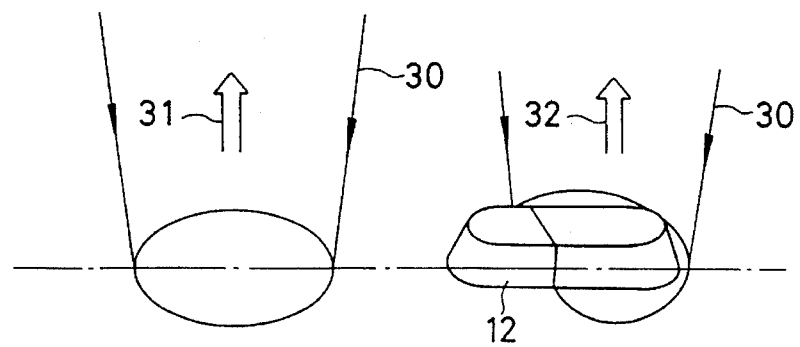
Figure 1C:
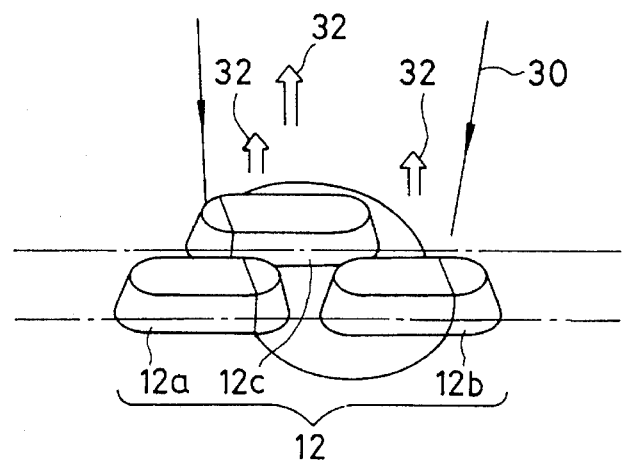

An optical disk according to the present invention will now be described referring to FIGS. 1 through 3.

Figure 2:
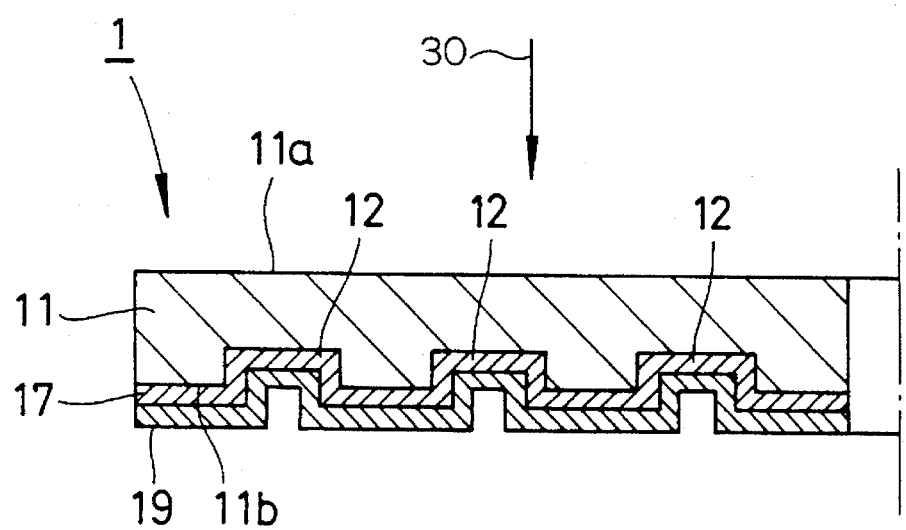
FIG. 2 is a schematic cross section of a half of one example of an optical disk according to the present invention, exemplifying its structure.

FIG. 2 illustrates an optical disk 1 as a first embodiment, which has so-called phase pits to ensure information recording and reproduction utilizing the phase difference.

This optical disk 1 has a substrate 11 and a shutter layer 17, formed on the substrate 11, and a light reflection layer 19 formed on the shutter layer 17.

The substrate 11 generally has a disk shape, with a flat surface 11a formed on the side of the substrate 11 where a light source for a light beam is to be located. Formed on the other surface, 11b, are a plurality of information pit portion which correspond to pieces of information such as audio and video information.

The substrate 11 is generally formed of various types of transparent resin materials, such as acrylic resins, polycarbonates and polyolefine type resins, and the information pit portion are normally formed at the same time as the substrate 11 is formed by injection molding.

The shutter layer 17, which serves to tighten the irradiated light beam for information reproduction (reading) or recording (writing), is formed on that side of the substrate 11 where the information pit portion are formed. This shutter layer 17 is formed by dispersing at least one kind of semiconductor fine particles, selected from the group consisting of CdS, CdSe, $CdS_xSe_{1-x}$, GaAs, amorphous Si, CdTe, CdTe, CdSe, ZnO, ZnS, ZnSe, ZnTe, GaP, GaN, AlAs, AlP, AlSb and amorphous SiC, into a matrix of glass or resins.

The amount of the semiconductor fine particles contained in the shutter layer 17 is 1 to 80 mol%, preferably 5 to 70 mol%.

When this amount exceeds 80 mol%, condensation of the semiconductor fine particles occurs so that they can no longer exist as fine particles. When the amount becomes less than 1 mol%, a sufficient shutter effect will not be provided, i.e., the difference between the transmittance with the shutter open and that with the shutter closed is small.

The particle size of the semiconductor fine particles contained is 0.1 to 50 nm, preferably 0.5 to 30 nm.

As a matrix (base) material for dispersing the semiconductor fine particles, glass, such as soda-lime glass, non-alkali glass, low-alkali glass and quartz glass, or a resin, such as polymethyl methacrylate, polycarbonates, polystyrenes, amorphous polyolefins and epoxy resins, is used. Such a matrix material should have a sufficient transparency at the wavelength of the light source used.

The method of dispersing semiconductor fine particles into a matrix differs depending on whether the matrix is glass or a resin.

When the matrix material is glass, the following methods are employed:

(1) After glass containing semiconductor components of high density is prepared by a super quenching method, it is subjected to heat treatment to precipitate semiconductor fine particles in the glass;

(2) Semiconductor fine particles are impregnated in liquid phase or vapor phase in pores of a porous glass;

(3) A solution in which semiconductor fine particles are dispersed is solidified by sol-gel technique; and (4) A thin glass film containing semiconductor fine particles is grown from the vapor phase by sputtering or the like.

When the matrix material is a resin, the following methods are employed:

(1) A solution in which semiconductor fine particles are dispersed is mixed with a resin solution, and film forming is performed by applying the mixture on a substrate by spin coating; and (2) A thin resin film containing semiconductor fine particles is grown from the vapor phase by sputtering, vapor deposition or the like.

The thickness of the thus formed shutter layer 17 is about 0.005 to 0.3 μm.

Figures 4A, 4B:
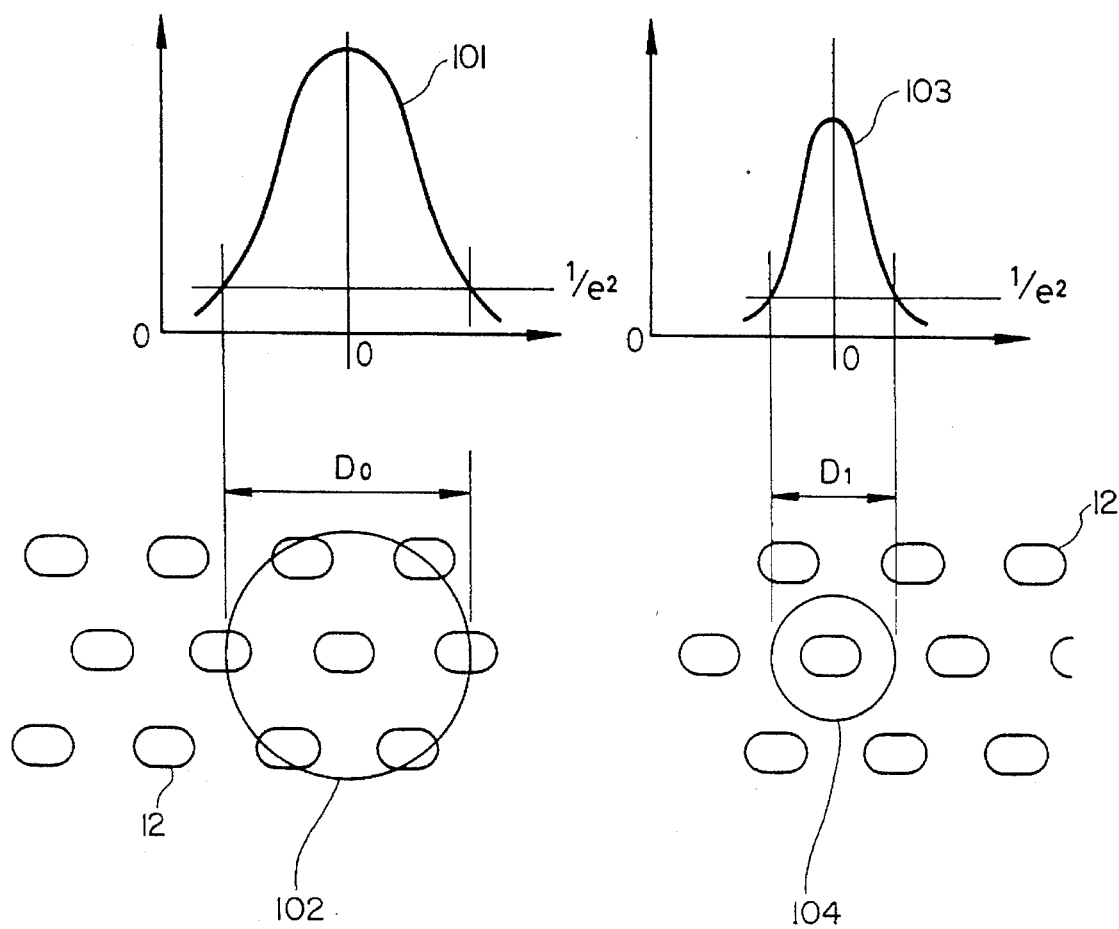

The function of the shutter layer 17 will now be described referring to FIGS. 4A and 4B. FIGS. 4A and 4B are schematic explanatory diagrams for explaining how a light beam is tightened by the shutter layer of the present invention; FIG. 4A shows a beam profile 101 with no shutter layer, while FIG. 4B shows a beam profile 103 with the shutter layer. As seen in FIG. 4A, the beam profile 101 results in an irradiated light beam 102 having a diameter $D_0$ at a point $1/e^2$. Without a shutter layer, the irradiated light beam 102 falls on a plurality of information pit portions 12. The beam profile 103 which results after the beam passes through the shutter layer, as seen in FIG. 4B, results in an irradiated light beam 104 having a diameter D1 at a point $1e^2$. The light beam 104 falls upon only one information pit portion 12. As can be seen in FIGS. 4A and 4B, the center of each of the irradiated light beams 102 and 104 corresponds to the center of the beam 30. It is apparent from the profiles in FIGS. 4A and 4B that the provision of the shutter layer can significantly tighten the beam to assure reading of a single recorded pit (FIG. 4B), which could not be read by the conventional method (FIG. 4A).

The objective wavelength of the light beam for information reading or writing on the optical disk of the present invention is 310 to 890 nm (nanometers), and the composition of the shutter layer 17 is appropriately selected in accordance with the wavelength actually employed.

The light reflection layer 19 is formed on the shutter layer 17 formed in the above manner. The light reflection layer 19 is formed of metal, such as Au, Ag, Cu and Al, which is deposited by various types of vacuum film forming methods, such as vacuum vapor film forming methods, sputtering and ion plating. The thickness of the light reflection layer 19 is about 0.03 to 0.3 μm.

An intermediate layer of ZnS, $SiO_2$, a mixture of them, or the like may be provided between the substrate and the shutter layer, or between the shutter layer 17 and the light reflection layer 19. A protective layer of various types of materials may further be provided on the reflection layer 19.

Figure 3:
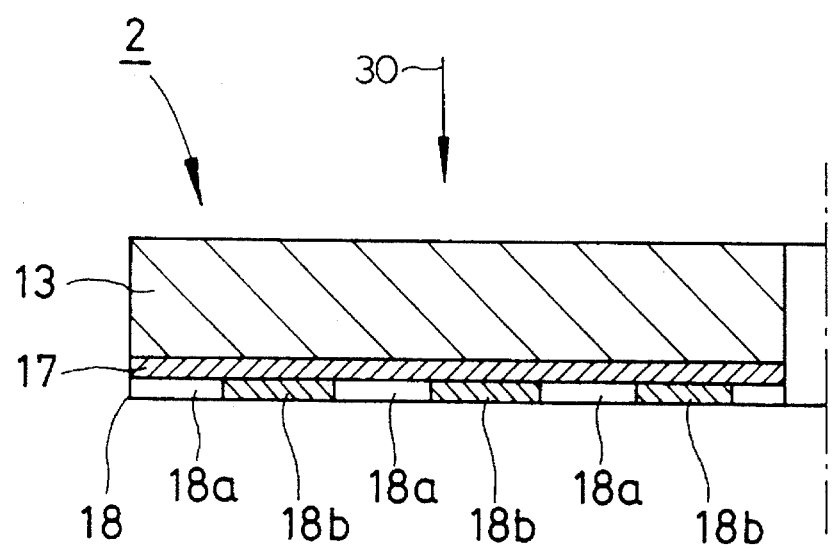
FIG. 3 is a schematic cross section of a half of another example of an optical disk according to the present invention, exemplifying its structure.

FIG. 3 illustrates an optical disk 2 as a second embodiment, on which pits to provide a difference in reflectance are formed to ensure information recording and reproduction utilizing the reflectance difference.

This optical disk 2 consists of a substrate 13 and a shutter layer 17, formed on the substrate 11, and a recording film 18 formed on the shutter layer 17. Unlike in the first embodiment, no recorded pits are formed on the substrate 13 of the second embodiment, but the recording film 18 to be described later is formed on the substrate 13 instead, and recording pits are formed on the recording film 18. The shutter layer 17 is the same as that of the first embodiment which has been described earlier.

The recording film 18 is formed of a material which causes a portion irradiated with light for information recording to have a different reflectance from the reflectance of that portion where no light is irradiated.

One example of this material is a phase changing type material, such as As—Te—Ge type, Sn—Te—Se type, $TeO_x$ ($0 < x < 2$), $Sb_2Se_3$ and $Bi_2Te_3$, which utilizes a phase change between non-crystalline and crystalline materials for information recording or reading. Another example of the recording film 18 includes a recording material obtained by the pit formation using an inorganic thin film of a Te type material or a thin film of an organic dye, such as cyanine dye or phthalocyanine dye. The recording film 18 may also be formed of a material, such as TbFeCo, GdCo or PtCo, which is used for a photomagnetic memory.

Further, an intermediate layer of ZnS, $SiO_2$, a mixture of them, or the like may be provided between the shutter layer 17 and the substrate 13 or between the shutter layer 17 and the recording film 18 in the second embodiment.

Furthermore, a reflection film of Au, Ag, Al, Cu or the like, or a protective layer of ZnS, $SiO_2$ or the like may be provided on the recording film 18.

Although the foregoing descriptions of those embodiments have been given mainly with reference to the case of tightening the read light beam, the present invention can of course be adapted to ensure high-density recording by tightening the write light beam.

In short, the optical disk according to the present invention has a shutter layer, formed directly or through an intermediate layer on a substrate, for tightening a light beam to be irradiated to read or write information, the shutter layer containing semiconductor fine particles. It is therefore possible to record information at high density or accurately reproduce such high-density recorded information.

What is claimed is:

1. An optical disk comprising:

a substrate; and a shutter layer, formed directly or through an intermediate layer on said substrate, for tightening a light beam to be irradiated to read or write information, said shutter layer containing fine semiconductor particles selected from a group consisting of CdS, CdSe, GaAs, amorphous Si, CdTe, ZnO, ZnS, ZnSe, ZnTe, GaP, GaN, AlAs, AlP, AlSb and amorphous SiC, wherein, said semiconductor particles range in size from 0.1 nm to 50 nm, and said shutter layer has a thickness of 0.005 μm to 0.3 μm.

2. An optical disk according to claim 1, wherein said shutter layer is formed by dispersing an amount of at least one kind of said semiconductor particles selected from the group into a matrix.

3. An optical disk according to claim 1, wherein the amount of said semiconductor particles contained in said shutter layer is 5 to 70 mol%.

4. An optical disk according to claim 2, wherein the amount of said semiconductor particles contained in said shutter layer is 5 to 70 mol%.

5. The optical disk according to claim 2, wherein said matrix is a glass or resin.

6. The optical disk according to claim 4, wherein said matrix is a glass or resin.

7. An optical disk according to claim 1, further comprising a light reflection layer formed on said shutter layer.

8. An optical disk according to claim 7, wherein said light reflection layer has a plurality of pits corresponding to pieces of information.

9. An optical disk according to claim 1, further comprising a recording film formed on said shutter layer.

10. An optical disk according to claim 9, wherein said recording film is made of a material which causes a portion irradiated with light for information recording to have a different reflectance from that of a portion where no light is irradiated.

11. An optical disk according to claim 10, wherein said material of the recording film is a phase changing type material of AsTeGe, SnTeSe, $TeO_x$, $Sb_2Se_3$ or $Bi_2Te_3$ wherein x has a value between 0 and 2.

12. An optical disk according to claim 10, wherein said material of the recording film is a cyanine dye or phthalocyanine dye.

13. An optical disk according to claim 10, wherein said material of the recording film is TbFeCo, GdCo or PtCo used for a photomagnetic memory.

* * * * *